United States Patent
Sung

(10) Patent No.: US 11,155,203 B2
(45) Date of Patent: Oct. 26, 2021

(54) PREDICTIVE CONTROL SYSTEM FOR INTELLIGENT HEAD LAMP AND METHOD THEREOF

(71) Applicant: HYUNDAI MOBIS CO., LTD., Seoul (KR)

(72) Inventor: Jun Young Sung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/991,367

(22) Filed: Aug. 12, 2020

(65) Prior Publication Data

US 2021/0213872 A1 Jul. 15, 2021

(30) Foreign Application Priority Data

Jan. 13, 2020 (KR) .................. 10-2020-0004007

(51) Int. Cl.
*B60Q 1/14* (2006.01)
*G06K 9/00* (2006.01)

(52) U.S. Cl.
CPC ......... *B60Q 1/143* (2013.01); *G06K 9/00825* (2013.01); *B60Q 2300/056* (2013.01); *B60Q 2300/41* (2013.01)

(58) Field of Classification Search
CPC .............. B60Q 1/143; B60Q 2300/056; B60Q 2300/41
See application file for complete search history.

(56) References Cited

U.S. PATENT DOCUMENTS

| 9,623,793 B2 * | 4/2017 | Langkabel ............ B60Q 1/085 |
| 10,118,535 B2 | 11/2018 | Park et al. |
| 10,272,823 B2 | 4/2019 | Sung |

FOREIGN PATENT DOCUMENTS

| JP | 2016-187990 | 11/2016 |
| KR | 10-1055078 | 8/2011 |
| KR | 10-2014-0147212 | 12/2014 |
| KR | 10-2015-0020839 | 2/2015 |
| KR | 10-2017-0028743 | 3/2017 |
| KR | 10-1895167 | 9/2018 |
| KR | 10-2018-0134072 | 12/2018 |

OTHER PUBLICATIONS

Japanese Office Action dated Aug. 24, 2021, issued in Japanese Patent Application No. 2020-127952 (with English Translation).

* cited by examiner

*Primary Examiner* — Robert J May
(74) *Attorney, Agent, or Firm* — H.C. Park & Associates, PLC

(57) ABSTRACT

A front imaging unit configured to obtain a front image by capturing an image of a view in front of a host vehicle, a detection sensor configured to simultaneously monitor front lateral and rear lateral blind spots of the host vehicle, a head lamp configured to radiate a high beam in front of the host vehicle on the basis of a radiation region set through the front imaging unit and the detection sensor, a vehicle control unit configured to generate a control command to control, in advance, a radiation form of the head lamp on the basis of information of the front imaging unit and the detection sensor, and a driving unit configured to drive the head lamp on the basis of the control command of the vehicle control unit.

14 Claims, 7 Drawing Sheets

PREDICTIVE CONTROL SYSTEM FOR INTELLIGENT HEAD LAMP AND METHOD THEREOF

CROSS-REFERENCE TO RELATED APPLICATION

This application claims priority from and the benefit of Korean Patent Application No 10-2020-0004007, filed on Jan. 13, 2020, which is hereby incorporated by reference for all purposes as if set forth herein.

BACKGROUND

Field

Exemplary embodiments/implementations relate to a predictive control system and method for an intelligent head lamp, and more particularly, to a predictive control system and method for an intelligent head lamp for fundamentally preventing blinding other drivers by extending a predictive control range of a blind spot by applying front lateral radar information and rear lateral radar information to a lamp system according to situations in which an overtaking vehicle suddenly appears or a vehicle ahead is followed.

Discussion of the Background

In general, an intelligent lamp, adaptive driving beam (ADB), or high beam assistance (HBA) is a camera-based night driving safety system configured to enhance visibility of a driver of a host vehicle while minimizing blinding damage to other drivers. However, such a night driving safety system is an incomplete system that may make a safety threat by temporarily blinding a driver of a vehicle which quickly appears from a blind spot due to a limitation of an angle of view of a single system.

Due to the characteristics of an image processing algorithm of a front camera, a target which suddenly appears cannot be detected in real time in situations in which an overtaking vehicle suddenly appears or a vehicle ahead is followed. Furthermore, due to a limitation of a light source recognition principle at night, it is difficult to determine, until a light source pair of rear lamps of a vehicle is completely exposed within an angle of view, that the light source belongs to a vehicle.

Furthermore, according to the prior art using rear lateral radar, a vehicle which ordinarily overtakes in an adjacent lane can be detected and a predictive control of a head lamp can be performed, but a vehicle which appears from a front lateral blind spot (a vehicle which suddenly appears from lanes other than adjacent lanes or a vehicle ahead which appears or deviates from an angle of view) cannot be detected, thus causing blinding.

The above information disclosed in this Background section is only for enhancement of understanding of the background of the invention and, therefore, it may contain information that does not constitute prior art.

SUMMARY

Exemplary embodiments of the present invention provide a predictive control system and method for an intelligent head lamp, which fundamentally prevent blinding other drivers by extending a predictive control range of a blind spot by applying front lateral radar information and rear lateral radar information to a lamp system according to situations in which an overtaking vehicle suddenly appears or a vehicle ahead is followed. According to the predictive control system and method for an intelligent head lamp, an intelligent head lamp system capable of performing 360° predictive control by overcoming blind spots using front/rear lateral radar, surrounding radar, or four-corner radar is provided, the performance of a glare free high beam can be improved with a technology configured to minimize blinding damage to a driver of an overtaking vehicle which suddenly appear or a vehicle travelling ahead without increasing a production cost, an intelligent head lamp can be used without requiring concern about damage to other drivers by minimizing glare, and the predictive control system and method for an intelligent head lamp can be implemented without increasing the number of components by utilizing sensors installed at different positions in a vehicle.

The technical objects of the present invention are not limited to the above-mentioned objects, and other technical objects may be clearly understood by those skilled in the art from the disclosure below.

An exemplary embodiment of the present invention provides a predictive control system for an intelligent head lamp, including a front imaging unit configured to obtain a front image by capturing an image of a view in front of a host vehicle; a detection sensor configured to simultaneously monitor front lateral and rear lateral blind spots of the host vehicle; a head lamp configured to radiate a high beam in front of the host vehicle on the basis of a radiation region set through the front imaging unit and the detection sensor; a vehicle control unit configured to generate a control command configured to control, in advance, a radiation form of the head lamp on the basis of information of the front imaging unit and the detection sensor; and a driving unit configured to drive the head lamp on the basis of the control command of the vehicle control unit.

The detection sensor may include front lateral radar and rear lateral radar, surrounding radar, or four-corner radar.

When the vehicle control unit determines that an overtaking vehicle is present at a left side or right side of the host vehicle by analyzing the information of the front imaging unit and the detection sensor, the vehicle control unit may transfer, to the driving unit, the control command to turn off, in advance, illumination on a left partial region when the overtaking vehicle appears at the left side or illumination on a right partial region when the overtaking vehicle appears at the right side in a case where the head lamp is an adaptive driving beam (ADB) head lamp, or may transfer, to the driving unit, the control command to turn off, in advance, the high beam that is being output when the overtaking vehicle appears at the left side or right side in a case where the head lamp is a high beam assistance (HBA) head lamp.

When the vehicle control unit determines that a vehicle ahead is present at a left side or right side of the host vehicle as a result of analyzing the information of the front imaging unit and the detection sensor, the vehicle control unit may transfer, to the driving unit, the control command to turn off, in advance, illumination on a left partial region when the vehicle ahead appears at the left side or illumination on a right partial region when the vehicle ahead appears at the right side in a case where the head lamp is an ADB head lamp, or may transfer, to the driving unit, the control command to turn off, in advance, the high beam that is being output when the vehicle ahead appears at the left side or right side in a case where the head lamp is an HBA head lamp.

When the vehicle control unit determines that an overtaking vehicle and a vehicle ahead are not present as a result of analyzing the information of the front imaging unit and the detection sensor, the vehicle control unit may transfer, to the driving unit the control command configured to allow the head lamp to output the high beam.

In accordance with another aspect of the present invention, a predictive control method for an intelligent head lamp is provided. The predictive control method includes: obtaining a front image by capturing an image of a view in front of a host vehicle using a front imaging unit and simultaneously monitoring front lateral and rear lateral blind spots of the host vehicle through a detection sensor; generating, by a vehicle control unit, a control command to control, in advance, a radiation form of a head lamp which radiates a high beam in front of the host vehicle on the basis of a radiation region set through the front imaging unit and the detection sensor; and driving, by a driving unit, the head lamp on the basis of the control command of the vehicle control unit.

Monitoring may include monitoring the front lateral and rear lateral blind spots of the host vehicle using front lateral radar and rear lateral radar, surrounding radar, or four-corner radar.

Generating of the control command may include determining, by the vehicle control unit, that an overtaking vehicle is present at a left side or right side of the host vehicle by analyzing information of the front imaging unit and the detection sensor; transferring, to the driving unit, the control command to turn off, in advance, illumination on a left partial region when the overtaking vehicle appears at the left side or illumination on a right partial region when the overtaking vehicle appears at the right side in a case where the head lamp is an adaptive driving beam (ADB) head lamp; and transferring, to the driving unit, the control command to turn off, in advance, the high beam that is being output when the overtaking vehicle appears at the left side or right side in a case where the head lamp is a high beam assistance (HBA) head lamp.

Generating of the control command may also include determining, by the vehicle control unit, that a vehicle ahead is present at a left side or right side of the host vehicle as a result of analyzing information of the front imaging unit and the detection sensor; transferring, to the driving unit, the control command to turn off, in advance, illumination on a left partial region when the vehicle ahead appears at the left side or illumination on a right partial region when the vehicle ahead appears at the right side in a case where the head lamp is an ADB head lamp; and transferring, to the driving unit, the control command to turn off, in advance, the high beam that is being output when the vehicle ahead appears at the left side or right side in a case where the head lamp is an HBA head lamp.

Generating of the control command may also include transferring, to the driving unit, the control command configured to allow the head lamp to output the high beam when the vehicle control unit determines that an overtaking vehicle and a vehicle ahead are not present as a result of analyzing information of the front imaging unit and the detection sensor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
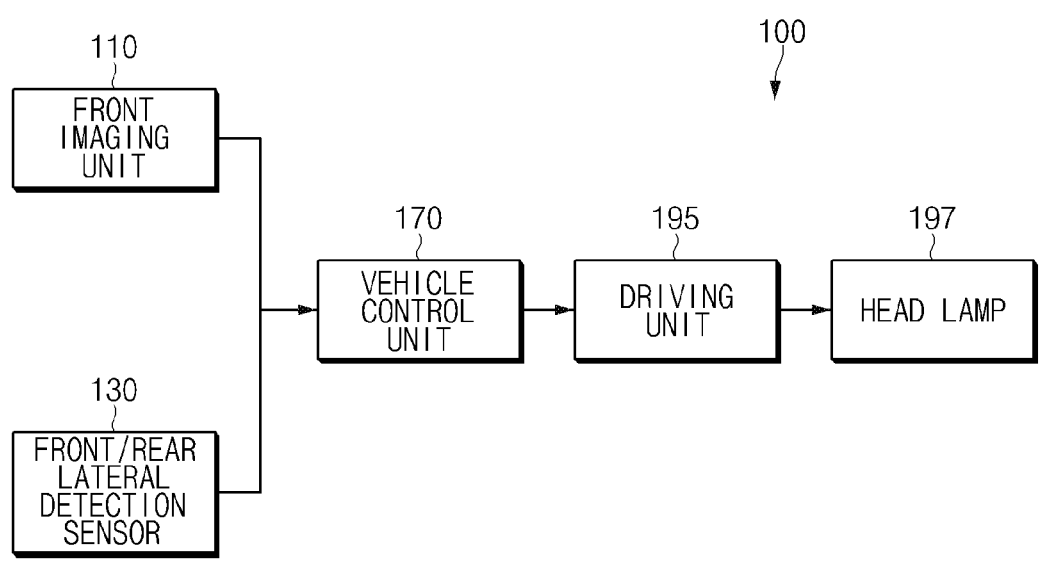
FIG. 1 is a block diagram illustrating a predictive control system for an intelligent head lamp according to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, some embodiment of the present invention will be described in detail with reference to the accompanying drawings. It should be noted that the same reference signs denote the same elements even if those elements are illustrated in different figures. Detailed descriptions related to well-known configurations or functions will not be provided when such descriptions are considered to hinder understanding of embodiments of the present invention.

The terms "first", "second", "A", "B", "(a)", "(b)" and the like may be used herein to describe elements of embodiments of the present invention. However, the terms are only used to distinguish one element from other elements, and the attributes or order of the elements are not limited by the terms. The terms used herein, including technical or scientific terms, have the same meanings as understood by those skilled in the art unless otherwise defined. It will be further understood that terms in common usage should also be interpreted as is customary in the relevant art and not in an idealized or overly formal sense unless expressly so defined herein.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, one or more components thereof may include or otherwise be associated with one or more memories (not shown) including code (e.g., instructions) configured to cause the sending of control commands including driving high beam and low beam head lamp illumination, as well as driving commands, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Hereinafter, embodiments of the present invention will be described in detail with reference to FIGS. 1 to 6.

Figure 2:
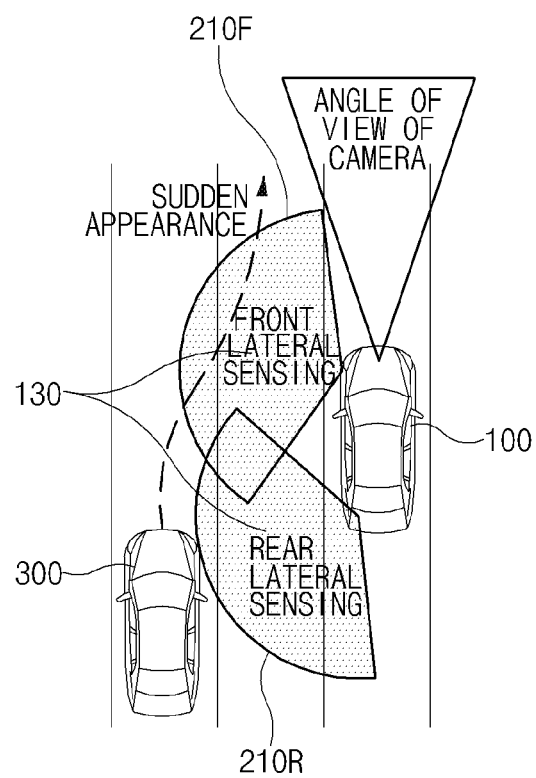
FIG. 2 is a diagram illustrating an initial state of the predictive control system for an intelligent head lamp according to embodiments described herein.
Figure 3:
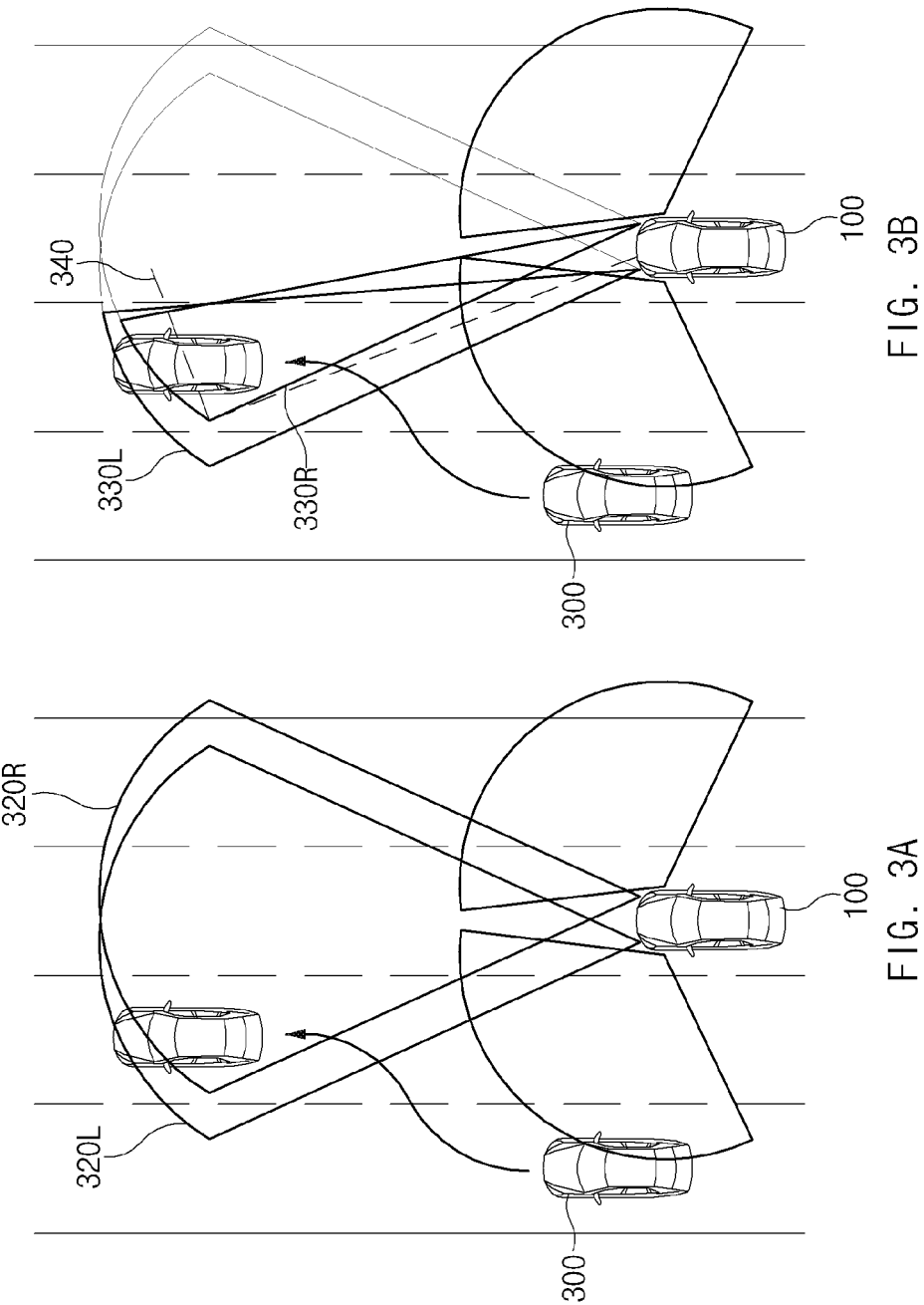
FIGS. 3A and 3B are diagrams illustrating an overtaking vehicle on a left side of a host vehicle of the predictive control system for an intelligent head lamp according to embodiments described herein.
Figure 4:
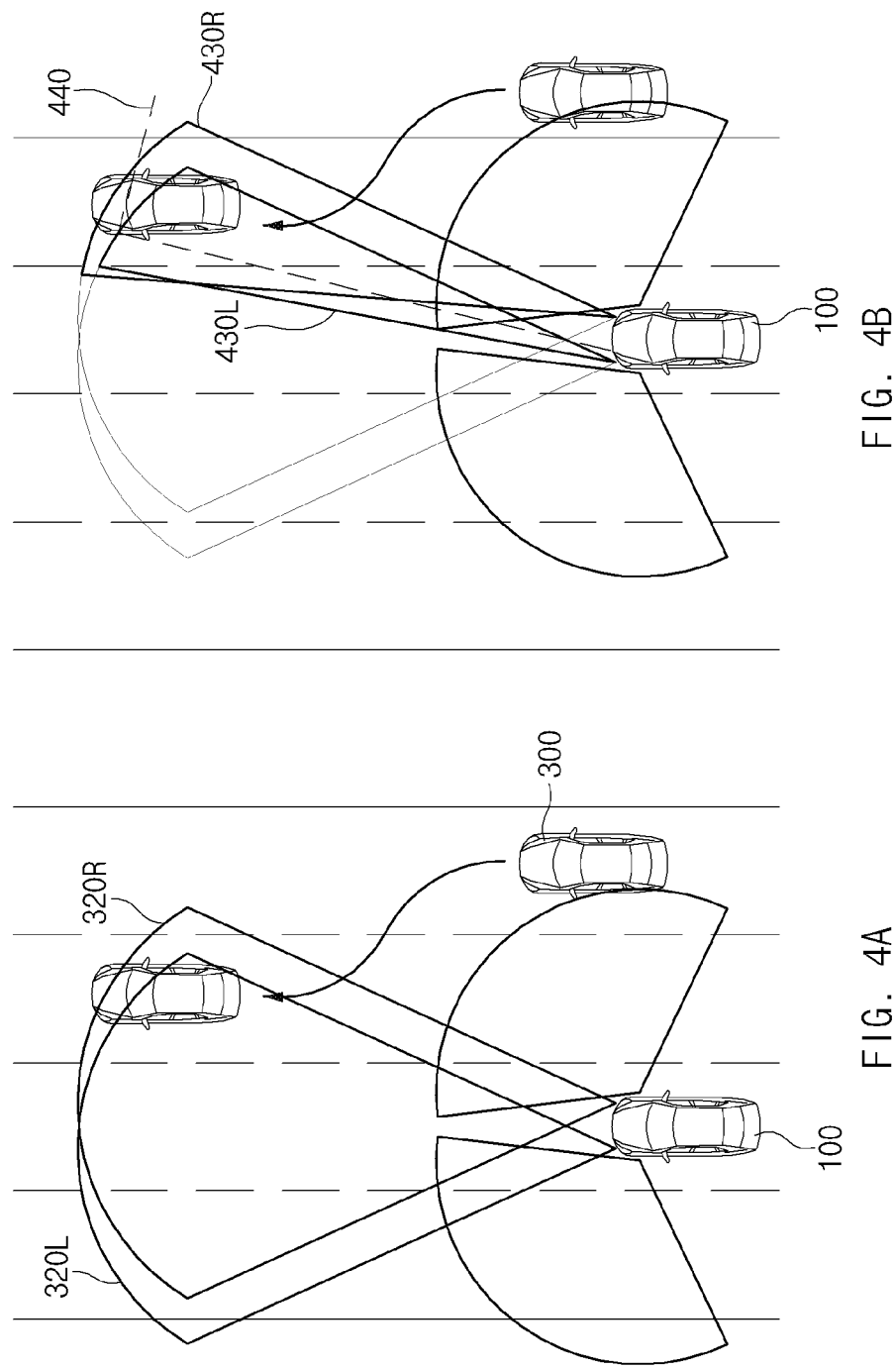
FIGS. 4A and 4B are diagrams illustrating an overtaking vehicle on a right side of a host vehicle in which the predictive control system for an intelligent head lamp according to an embodiment of the present invention is applied to an overtaking vehicle.
Figure 5:
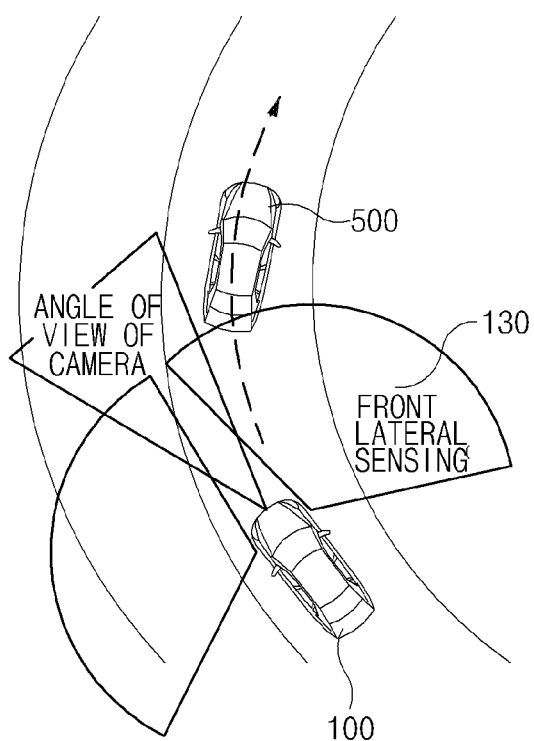
FIG. 5 is a diagram illustrating a state in which the predictive control system for an intelligent head lamp according to an embodiment of the present invention is applied to a vehicle ahead.

FIG. 1 is a block diagram illustrating a predictive control system 100 for an intelligent head lamp according to an embodiment of the present invention, FIGS. 2 to 4 are diagrams illustrating states in which the predictive control system for an intelligent head lamp according to an embodiment of the present invention is applied to an overtaking vehicle, and FIGS. 5 and 6 are diagrams illustrating states in which the predictive control system for an intelligent head lamp according to an embodiment of the present invention is applied to a vehicle ahead.

Referring to FIG. 1, the predictive control system 100 for an intelligent head lamp may include a front imaging unit 110, a front/rear lateral detection sensor 130, a vehicle control unit 170, a driving unit 195, and a head lamp 197.

The front imaging unit 110 is provided with a camera, and may obtain a front image by capturing an image of a view in front of a host vehicle 100 through the camera.

The front/rear lateral detection sensor 130, which may be called a blind spot detection (BSD) sensor configured to simultaneously monitor front and rear lateral blind spots of the host vehicle 100, and may include a front lateral radar, a rear lateral radar, a surrounding radar or a four-corner radar.

The head lamp 197 radiates a beam in front of the host vehicle 100 on the basis of a radiation region set by the vehicle control unit 170. Here, the head lamp 197 may be an adaptive driving beam (ADB) head lamp of which an illumination angle, brightness, width, and length are changed to radiate a beam, or the head lamp 197 may be a high beam assistance (HBA) head lamp which recognizes a vehicle travelling in an opposite lane to automatically switch from a high beam to a low beam.

The driving unit 195 may receive a control command of the vehicle control unit 170, and may drive the head lamp 197 on the basis of the control command. The driving unit 195 may be provided with an actuator including a motor, and may drive the head lamp 160 through the actuator so as to output a high beam by orienting the head lamp 197 upwards or output a low beam by orienting the head lamp 197 downwards.

The vehicle control unit 170 may be an electronic control unit (ECU) configured to generate a control command to control in advance a radiation form of the head lamp 197. The radiation form may be an illumination shone from head lamps 197 of the vehicle 100 including the changing of an illumination from high to low, from low to high, or may be an illumination that maintains a previous state. The control command may be made on the basis of a front image obtained through the front imaging unit 110 and information about front and rear lateral blind spots of the host vehicle 100 detected by the front/rear lateral detection sensor 130. The vehicle control unit 170 may transfer the control command to the driving unit 195.

In detail, the vehicle control unit 170 may analyze the information about the front and rear lateral blind spots of the host vehicle 100 in order to determine whether an overtaking vehicle 300 (illustrated in FIG. 2) and a vehicle ahead 500 (illustrated in FIG. 5) are present.

FIG. 2 is a diagram illustrating an initial state of the predictive control system for an intelligent head lamp according to embodiments described herein. In FIG. 2 a front angle of a camera, front layer sensing and rear lateral sensing from sensor 130 are obtained, a field of view of one hundred eighty degrees may be obtained. Similarly, when regions on the right side of a vehicle are obtained, an intelligent head lamp system capable of performing 360° predictive control by overcoming blind spots using front/rear lateral radar, surrounding radar, or four-corner radar is provided.

When it is determined that the overtaking vehicle 300 and the vehicle ahead 500 are not present as a result of determination, the vehicle control unit 170 may generate a control command configured to allow the head lamp 197 to output a high beam, and may transfer the control command to the driving unit 195.

FIGS. 3A and 3B are diagrams illustrating an overtaking vehicle on a left side of a host vehicle of the predictive control system for an intelligent head lamp according to embodiments described herein. FIGS. 4A and 4B are diagrams illustrating an overtaking vehicle on a right side of a host vehicle in which the predictive control system for an intelligent head lamp according to an embodiment of the present invention is applied to an overtaking vehicle.

An overtaking vehicle 300 may be determined to be present at a right side (FIGS. 4A and 4B) or left side (FIGS. 3A and 3B) of the host vehicle 100 as a result of analyzing the front image and the information about the front and rear lateral blind spots of the host vehicle 100. That is, when the overtaking vehicle 300 travels at the left side of the host vehicle 100 and attempts to overtake the host vehicle 100, the vehicle control unit 170 may predict that the overtaking vehicle 300 will travel in front of the host vehicle 100 if the overtaking vehicle 300 is detected through the front/rear lateral sensor 130 of the host vehicle 100 after the overtaking vehicle 300 is detected through the front/rear lateral sensor 300 of the host vehicle 100, and may transfer, in advance, a control command to control the head lamp 197 to the driving unit 195.

As illustrated in FIG. 3A, beams 320L and 320R may represent high beam illumination output from the host vehicle 100 in normal high beam operation. As the overtaking vehicle traverses the rear lateral sensing region 210R and front lateral sensing region 210F, the vehicle control unit 170 may transfer, to the driving unit 195, a control command to turn off, in advance, as illustrated in FIG. 3A the high beams 320L and 320R that are being output so as to change the high beam as illustrated in FIG. 3B to low beams 330L and 330R when the overtaking vehicle 300 appears at the left side of the host vehicle 100. This may be in the case where the head lamp 197 is an HBA head lamp (FIG. 3A). Thus the vehicle control unit 170 may transfer, to the driving unit 195, a control command to turn off, in advance, illumination beams 320L and 320R of a partial left region so as illuminate using smaller area low beams 330L and 33R to form an L-shape beam pattern 340 (illustrated by dashed lines) and form a dark zone in a radiation region corresponding to the left side of the host vehicle 100. This may occur when the overtaking vehicle 300 appears at the left side of the host vehicle 100 in the case where the head lamp 197 is an ADB head lamp (FIG. 3B) Thus the system may fundamentally prevent blinding a driver of the overtaking vehicle 300 by turning off, in advance, the high beam. The term "in advance" may refer to a time period before the overtaking vehicle 10 enters a high beam region of the host vehicle 100.

Likewise, when the overtaking vehicle 300 travels at the right side of the host vehicle 100 and attempts to overtake the host vehicle 100, the vehicle control unit 170 may predict that the overtaking vehicle 300 will travel in front of the host vehicle 100 if the overtaking vehicle 300 is detected through the front/rear lateral sensor 130 of the host vehicle 100 after the overtaking vehicle 300 is detected through the front/rear lateral sensor 130 of the host vehicle 100, and may transfer, in advance, a control command to control the head lamp 197 to the driving unit 195.

As illustrated in FIGS. 4A and 4B, the vehicle control unit 170 may transfer, to the driving unit 195, a control command to turn off, in advance, a high beams 420L and 420R illustrated in FIG. 4A that are being output towards the left, front, and right of the vehicle 100 so as to change the high beams 420L and 420R to low beams 430L and 430R illustrated in FIG. 4B when the overtaking vehicle 300 appears at the right side of the host vehicle 100. This may occur in the case where the head lamp 197 is an HBA head lamp (FIG. 4A). Thus the vehicle control unit 170 may transfer, to the driving unit 195, a control command to turn off, in advance, illumination beams 420L and 420R on a partial right region so as illuminate using smaller area low beams 430L and 430R to form an L-shape beam pattern 440 (illustrated by dashed lines) and form a dark zone in a radiation region corresponding to the right side of the host vehicle 100. This may occur when the overtaking vehicle 300 appears at the right side of the host vehicle 100 in the case where the head lamp 197 is an ADB head lamp (FIG. 4B). Thus the system may fundamentally prevent blinding the driver of the overtaking vehicle 300 by turning off, in advance, the high beam before the overtaking vehicle 10 enters a high beam region of the host vehicle 100.

FIG. 5 is a diagram illustrating a state in which the predictive control system for an intelligent head lamp according to an embodiment of the present invention is applied to a vehicle ahead.

Referring to FIG. 5, when the vehicle ahead 500 is determined to be present at the right side or left side of the host vehicle 100 as a result of analyzing the front image and the information about the front and rear lateral blind spots of the host vehicle 100, i.e., when the vehicle ahead 500 is present at a front right side of the host vehicle 100 on a right curved road, the vehicle control unit 170 may transfer a control command to the driving until 195 in order to control the head lamp 197. This may occur if the vehicle ahead 500 is detected through the front imaging unit 110 and the front lateral sensor 130.

Therefore, the vehicle control unit 170 may transfer, to the driving unit 195, a control command to turn off a high beam that is being output so as to change the high beam to a low beam when the vehicle ahead 500 appears at the right side of the host vehicle 100. This may happen in the case where the head lamp 197 is an HBA head lamp (FIG. 6A), or may transfer, to the driving unit 195, a control command to turn off illumination on a partial right region. This may be to form an L-shape beam pattern and form a dark zone in a radiation region corresponding to the right side of the host vehicle 100. This may occur when the vehicle ahead 500 appears at the right side of the host vehicle 100 and when the head lamp 197 is an ADB head lamp (FIG. 6B). This may fundamentally prevent blinding a driver of the vehicle ahead 500 by turning off the high beam before the vehicle ahead 500 enters a high beam region of the host vehicle 100.

Similarly, when the vehicle ahead 500 is present at a front left side of the host vehicle 100 on a left curved road, the vehicle control unit 170 may transfer, in advance, a control command to the driving unit 195 in order to control the head lamp 197 if the vehicle ahead 500 is detected through the front imaging unit 110 and the front lateral sensor 130.

Figure 6A:
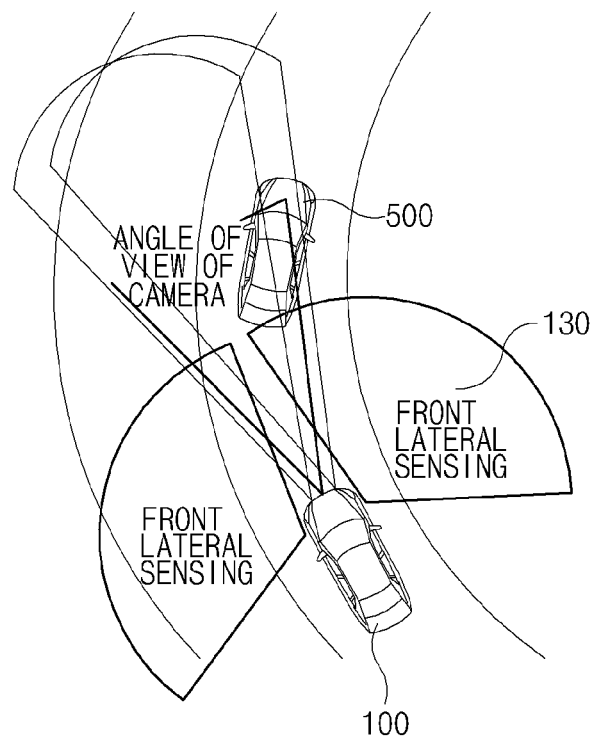
FIGS. 6A and 6B are diagrams illustrating states in which the predictive control system for an intelligent head lamp according to an embodiment of the present invention is applied to a vehicle ahead.
Figure 6B:
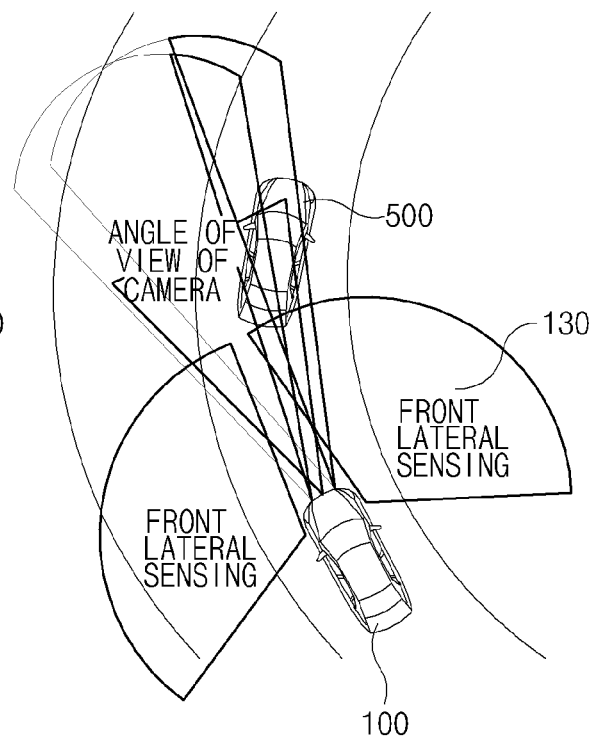

FIGS. 6A and 6B are diagrams of another state in which the predictive control system for an intelligent head lamp according to an embodiment of the present invention is applied to a vehicle ahead.

Therefore, the vehicle control unit 170 may transfer, to the driving unit 195, a control command to turn off, in advance, a high beam that is being output so as to change the high beam to a low beam when the vehicle ahead 500 appears at the left side of the host vehicle 100. This may happen in a case where the head lamp 197 is an HBA head lamp (FIG. 6A), or may transfer, to the driving unit 195, a control command to turn off, in advance, illumination on a partial left region so as to form an L-shape beam pattern and form a dark zone in a radiation region corresponding to the left side of the host vehicle 100. This may occur when the vehicle ahead 500 appears at the left side of the host vehicle 100 in the case where the head lamp 197 is an ADB head lamp (FIG. 6B). This may fundamentally prevent blinding a driver of the vehicle ahead 500 by turning off the high beam before the vehicle ahead 500 enters a high beam region of the host vehicle 100. When the vehicle ahead 500 appears again within a high beam region of the host vehicle 100 after deviating from the high beam region of the host vehicle 100 on a curved road having a high curvature such as the relative curvatures illustrated herein, the vehicle ahead 500 may be detected outside the high beam region of the host vehicle 100 by using a front lateral sensor having a wider detection range than that of the front imaging unit 110. When there is a possibility that the vehicle ahead 500 will appear again within the high beam region of the host vehicle 100, the high beam of the host vehicle 100 may be turned off in advance before the vehicle ahead 500 enters the high beam region of the host vehicle 100, thus fundamentally preventing blinding the driver of the vehicle ahead 500.

Figure 7:
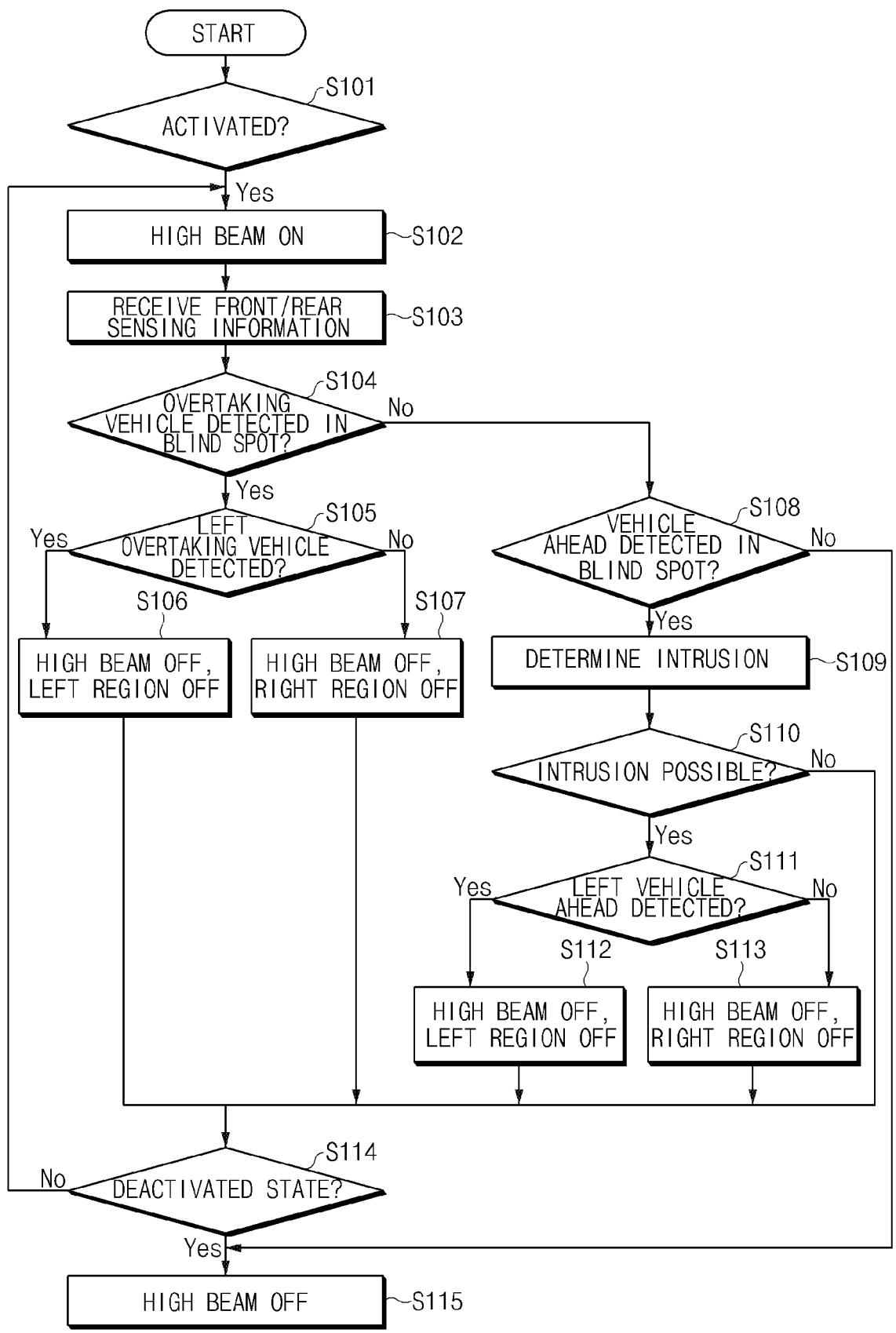
FIG. 7 is a flowchart illustrating a predictive control method for an intelligent head lamp according to an embodiment of the present invention.

Hereinafter, a predictive control method for an intelligent head lamp according to an embodiment of the present invention will be described in detail with reference to FIG. 7. FIG. 7 is a flowchart illustrating a predictive control method for an intelligent head lamp according to an embodiment of the present invention.

Here, it is assumed that the predictive control system for an intelligent head lamp illustrated in FIG. 1 performs the process of FIG. 7.

First, it is determined whether an operation condition of the head lamp 197 is satisfied (S101). The high beam of the head lamp 197 is turned on (S102) if the operation condition is satisfied, or the high beam of the head lamp 197 is turned off if the operation condition is not satisfied (S115).

Here, the operation condition of the head lamp 197 may be, for example, satisfaction of a condition such as a preset time, preset illuminance, date, or the like. For example, the head lamp 197 may be controlled so that the head lamp 197 automatically enters an on state after 5 p.m., or the head lamp 197 may be controlled so that the head lamp 197 enters an on state when illuminance is low in daytime due to rainy or cloudy weather.

As described above, when the head lamp 197 is in an on state, a control operation is performed by the vehicle control unit 170. A front image is obtained by capturing an image of a view in front of the host vehicle 100 through the front imaging unit 110, and the front and rear lateral blind spots of the host vehicle 100 are simultaneously monitored through the front/rear lateral detection sensor 130 (S103).

Thereafter, the vehicle control unit 170 analyzes information obtained from the front imaging unit 110 and the front/rear lateral detection sensor 130 (S104). The overtaking vehicle 300 is determined to be present at the left side of the host vehicle 100 (S105), and, in the case where the head lamp 197 is an HBA head lamp, a control command to turn off, in advance, a high beam that is being output is transferred to the driving unit 195. Or, in the case where the head lamp 197 is an ADB head lamp, a control command to turn off, in advance, illumination on a partial left region is transferred to the driving unit 195 (S106).

In an operation, the vehicle control unit 170 analyzes information of the front imaging unit 110 and the front/rear lateral detection sensor 130 (S104). The overtaking vehicle 300 is determined to be present at the right side of the host vehicle 100, and, in the case where the head lamp 197 is an HBA head lamp, a control command to turn off, in advance, a high beam that is being output is transferred to the driving unit 195. Or, in the case where the head lamp 197 is an ADB head lamp, a control command to turn off, in advance, illumination on a partial right region is transferred to the driving unit 195 (S107).

The vehicle control unit 170 analyzes information of the front imaging unit 110 and the front/rear lateral detection sensor 130 (S104). The vehicle ahead 500 may be determined to be present at a blind spot (S108), and it is determined whether the vehicle ahead 500 will appear within the high beam region of the host vehicle 100 (S109).

Thereafter, when there is a possibility that the vehicle ahead 500 will appear within the high beam region of the host vehicle 100 (S110), and the vehicle ahead 500 is present at the left side of the host vehicle 100 (S111), a control command to turn off, in advance, a high beam that is being output is transferred to the driving unit 195. This may occur in the case where the head lamp 197 is an HBA head lamp, or a control command to turn off, in advance, illumination on a partial left region is transferred to the driving unit 195 in the case where the head lamp 197 is an ADB head lamp (S112).

Furthermore, when the vehicle ahead 500 is present at the right side of the host vehicle 100 (S111), a control command to turn off, in advance, a high beam that is being output is transferred to the driving unit 195. This may occur in the case where the head lamp 197 is an HBA head lamp, or a control command to turn off, in advance, illumination on a partial right region is transferred to the driving unit 195 in the case where the head lamp 197 is an ADB head lamp (S113).

Thereafter, after performing a control operation, the vehicle control unit 170 may determine again whether the operation condition is satisfied to determine whether to continuously perform the control operation or end the control operation (S114).

The above-described predictive control system and method for an intelligent head lamp fundamentally prevent blinding other drivers by extending a predictive control range of a blind spot and applying front lateral radar information and rear lateral radar information to a lamp system. This may be done according to situations in which an overtaking vehicle suddenly appears or a vehicle ahead is followed. According to the predictive control system and method for an intelligent head lamp, an intelligent head lamp system capable of performing 360° predictive control by overcoming blind spots using front/rear lateral radar, surrounding radar, or four-corner radar is provided, the performance of a glare free high beam can be improved with a technology to minimize blinding damage to a driver of an overtaking vehicle which suddenly appear or a vehicle travelling ahead without increasing a production cost. An intelligent head lamp can be used without requiring concern about damage to other drivers by minimizing glare, and the predictive control system and method for an intelligent head lamp can be implemented without increasing the number of components by utilizing sensors installed at different positions in a vehicle.

Furthermore, the predictive control method for an intelligent head lamp including operations S101 to S115 according to the present invention may be programmed and stored in a computer-readable recording medium.

Thus, the embodiments described herein are provided to describe the technical concept of the present invention rather than limiting the technical concept of the present invention, and the scope of the technical concept of the present invention is not limited to the embodiments. The scope of protection for the present invention should be defined by the following claims, and all technical concepts that fall within the same scope should be construed as being included in the scope of the right of the present invention.

What is claimed is:

1. A predictive control system for an intelligent head lamp, comprising:
 a front imaging unit configured to obtain a front image by capturing an image of a view in front of a host vehicle;
 a detection sensor configured to simultaneously monitor front lateral and rear lateral blind spots of the host vehicle;
 a head lamp configured to radiate a high beam in front of the host vehicle on the basis of a radiation region set through the front imaging unit and the detection sensor;
 a vehicle control unit configured to generate a control command to change a radiation form of the head lamp on the basis of information of the front imaging unit and the detection sensor, wherein the information includes that an overtaking vehicle is present in a lane other than an adjacent lane of the host vehicle; and
 a driving unit configured to drive the head lamp on the basis of the control command from the vehicle control unit.

2. The predictive control system of claim 1, wherein the control command is issued before the overtaking vehicle enters a high beam region of the host vehicle.

3. The predictive control system of claim 1, wherein the detection sensor comprises front lateral radar and rear lateral radar, surrounding radar, or four-corner radar.

4. The predictive control system of claim 1, wherein, when the vehicle control unit determines that the overtaking vehicle is present at a left side or right side of the host vehicle by analyzing the information of the front imaging unit and the detection sensor, the vehicle control unit transfers, to the driving unit, the control command to turn off, in advance, illumination on a left partial region when the overtaking vehicle appears at the left side or illumination on a right partial region when the overtaking vehicle appears at the right side in a case where the head lamp is an adaptive driving beam (ADB) head lamp, or transfers, to the driving unit, the control command to turn off, in advance, the high beam that is being output when the overtaking vehicle appears at the left side or right side in a case where the head lamp is a high beam assistance (HBA) head lamp.

5. The predictive control system of claim 1, wherein, when the vehicle control unit determines that a vehicle ahead is present at a left side or right side of the host vehicle as a result of analyzing the information of the front imaging unit and the detection sensor, the vehicle control unit transfers, to the driving unit, the control command to turn off, in advance, illumination on a left partial region when the vehicle ahead appears at the left side or illumination on a right partial region when the vehicle ahead appears at the right side in a case where the head lamp is an ADB head lamp, or transfers, to the driving unit, the control command to turn off, in advance, the high beam that is being output when the vehicle ahead appears at the left side or right side in a case where the head lamp is an HBA head lamp.

6. The predictive control system of claim 1, wherein, when the vehicle control unit determines that the overtaking vehicle and a vehicle ahead are not present as a result of analyzing the information of the front imaging unit and the detection sensor, the vehicle control unit transfers, to the driving unit, the control command configured to allow the head lamp to output the high beam.

7. A predictive control method for an intelligent head lamp, comprising:
 obtaining a front image by capturing an image of a view in front of a host vehicle using a front imaging unit and simultaneously monitoring front lateral and rear lateral blind spots of the host vehicle through a detection sensor;
 generating, by a vehicle control unit, a control command to control a radiation form of a head lamp which radiates a high beam in front of the host vehicle on the basis of a radiation region set through the front imaging unit and the detection sensor, wherein information from the front imaging unit and detection sensor includes that an overtaking vehicle is present in a lane other than an adjacent lane of the host vehicle; and
 driving, by a driving unit, the head lamp on the basis of the control command of the vehicle control unit.

8. The predictive control method of claim 7, wherein the control command is issued before the overtaking vehicle enters a high beam region of the host vehicle.

9. The predictive control method of claim 7, wherein the monitoring comprises monitoring the front lateral and rear lateral blind spots of the host vehicle using front lateral radar and rear lateral radar, surrounding radar, or four-corner radar.

10. The predictive control method of claim 7, wherein the generating of the control command comprises:
 determining, by the vehicle control unit, that the overtaking vehicle is present at a left side or right side of the host vehicle by analyzing information of the front imaging unit and the detection sensor;
 transferring, to the driving unit, the control command to turn off, in advance, illumination on a left partial region when the overtaking vehicle appears at the left side or illumination on a right partial region when the overtaking vehicle appears at the right side in a case where the head lamp is an adaptive driving beam (ADB) head lamp; and
 transferring, to the driving unit, the control command to turn off, in advance, the high beam that is being output when the overtaking vehicle appears at the left side or right side in a case where the head lamp is a high beam assistance (HBA) head lamp.

11. The predictive control method of claim 7, wherein the generating of the control command comprises:
 determining, by the vehicle control unit, that a vehicle ahead is present at a left side or right side of the host vehicle as a result of analyzing information of the front imaging unit and the detection sensor;
 transferring, to the driving unit, the control command to turn off, in advance, illumination on a left partial region when the vehicle ahead appears at the left side or illumination on a right partial region when the vehicle ahead appears at the right side in a case where the head lamp is an ADB head lamp; and
 transferring, to the driving unit, the control command to turn off, in advance, the high beam that is being output when the vehicle ahead appears at the left side or right side in a case where the head lamp is an HBA head lamp.

12. The predictive control method of claim 7, wherein the generating of the control command comprises transferring, to the driving unit, the control command configured to allow the head lamp to output the high beam when the vehicle control unit determines that the overtaking vehicle and a vehicle ahead are not present as a result of analyzing information of the front imaging unit and the detection sensor.

13. A non-transitory computer readable medium having stored thereon software instructions that, when executed by a processor, cause the processor to generate control signals to control a predictive control method for an intelligent head lamp, comprising:
  obtaining a front image by capturing an image of a view in front of a host vehicle using a front imaging unit and simultaneously monitoring front lateral and rear lateral blind spots of the host vehicle through a detection sensor;
  determining that a vehicle different from the host vehicle is traveling in front of the host vehicle on a curve;
  generating, by a vehicle control unit, a control command to control a radiation form of a head lamp which radiates a high beam in front of the host vehicle on the basis of a radiation region set through the front imaging unit and the detection sensor; and
  driving, by a driving unit, the head lamp on the basis of the control command of the vehicle control unit.

14. The method of claim 13, wherein the vehicle different from the host vehicle is travelling in a different lane than the host vehicle.

* * * * *